US011610589B2

(12) United States Patent
Gustafson et al.

(10) Patent No.: US 11,610,589 B2
(45) Date of Patent: *Mar. 21, 2023

(54) METHOD AND SYSTEM FOR IMPLEMENTING VOICE MONITORING AND TRACKING OF PARTICIPANTS IN GROUP SETTINGS

(71) Applicant: CenturyLink Intellectual Property LLC, Broomfield, CO (US)

(72) Inventors: Pamela K. Gustafson, Overland Park, KS (US); Pranav Badhwar, Washington, DC (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 49 days.

This patent is subject to a terminal disclaimer.

(21) Appl. No.: 17/335,134

(22) Filed: Jun. 1, 2021

(65) Prior Publication Data

US 2021/0287679 A1   Sep. 16, 2021

Related U.S. Application Data

(63) Continuation of application No. 16/411,447, filed on May 14, 2019, now Pat. No. 11,031,015.

(60) Provisional application No. 62/823,488, filed on Mar. 25, 2019.

(51) Int. Cl.
| | |
|---|---|
| *G10L 17/00* | (2013.01) |
| *G06F 3/01* | (2006.01) |
| *H04R 3/00* | (2006.01) |
| *H04R 5/04* | (2006.01) |
| *H04R 5/027* | (2006.01) |
| *G06F 3/16* | (2006.01) |

(52) U.S. Cl.
CPC .............. *G10L 17/00* (2013.01); *G06F 3/011* (2013.01); *G06F 3/16* (2013.01); *H04R 3/005* (2013.01); *H04R 5/027* (2013.01); *H04R 5/04* (2013.01)

(58) Field of Classification Search
CPC . G10L 17/00; G06F 3/011; G06F 3/16; G06F 3/167; H04R 3/005; H04R 5/027; H04R 5/04
See application file for complete search history.

(56) References Cited

U.S. PATENT DOCUMENTS

| | | | |
|---|---|---|---|
| 2015/0317123 A1* | 11/2015 | Wu | H04M 3/568 |
| | | | 715/727 |
| 2017/0270930 A1* | 9/2017 | Ozmeral | G06F 3/167 |
| 2020/0312331 A1 | 10/2020 | Gustafson | |

* cited by examiner

*Primary Examiner* — Fan S Tsang
*Assistant Examiner* — David Siegel

(57) ABSTRACT

Novel tools and techniques are provided for implementing voice monitoring and tracking, and, more particularly, to methods, systems, and apparatuses for implementing voice monitoring and tracking of participants in group settings. In various embodiments, a computing system might receive, from at least one audio sensor among the one or more audio sensors disposed within the first space, voice signals corresponding to voices associated with individuals present within the first space. The computing system might analyze the received voice signals to identify one or more individuals who are present within the first space. The computing system might present, within a user interface of the user device associated with the user, information regarding the identified one or more individuals to assist the user in coordinating discussions among the individuals present within the first space.

17 Claims, 7 Drawing Sheets

METHOD AND SYSTEM FOR IMPLEMENTING VOICE MONITORING AND TRACKING OF PARTICIPANTS IN GROUP SETTINGS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing voice monitoring and tracking, and, more particularly, to methods, systems, and apparatuses for implementing voice monitoring and tracking of participants in group settings.

BACKGROUND

In typical classrooms, it is difficult if not impossible to accurately track student participation, particularly where student participation is important for the grades of the students. This is compounded by situations where teachers are overwhelmed by unruly students, where teachers are unconsciously biased by particular students demanding attention or dominating class discussions, where students at the rear of the classroom cannot be heard well by the teacher, where shy students are unwittingly discouraged from speaking up in class, etc.

In other situations, such as conference settings, presentations, press conferences, etc., it is difficult to coordinate or moderate questions from the audience members (which might include members of the press, fans, group participants, etc.), and sometimes questions might be difficult for the speaker or moderator to hear. In some cases, unconscious bias, difficulty in hearing voices, etc. might lead to some audience members not getting their questions answered.

Hence, there is a need for more robust and scalable solutions for implementing voice monitoring and tracking, and, more particularly, to methods, systems, and apparatuses for implementing voice monitoring and tracking of participants in group settings.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
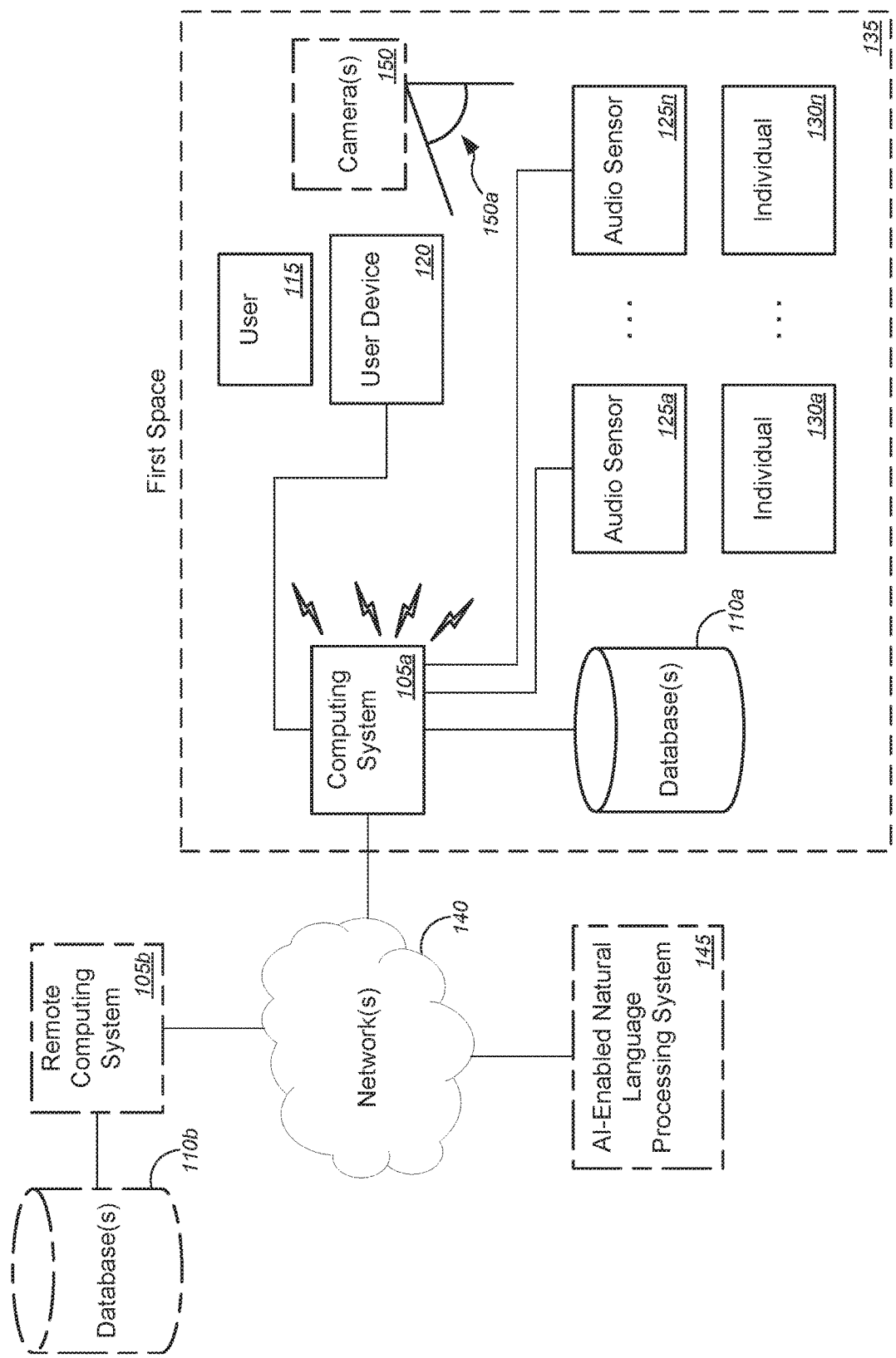
FIG. 1 is a schematic diagram illustrating a system for implementing voice monitoring and tracking of participants in group settings, in accordance with various embodiments.

Various embodiments provide tools and techniques for implementing voice monitoring and tracking, and, more particularly, to methods, systems, and apparatuses for implementing voice monitoring and tracking of participants in group settings.

In various embodiments, a computing system might receive, from at least one audio sensor among the one or more audio sensors disposed within the first space, voice signals corresponding to voices associated with individuals present within the first space. The computing system might analyze the received voice signals to identify one or more individuals who are present within the first space. The computing system might present, within a user interface of the user device associated with the user, information regarding the identified one or more individuals to assist the user in coordinating discussions among the individuals present within the first space.

According to some embodiments, the user might be a teacher and the individuals present within the first space might be students. In such cases, the computing system might track which students spoke what words and when and in response to which questions posed by the teacher. Alternatively, or additionally, the computing system might generate a list of students in a participation list based at least in part on one or more of responses by the students, lack of participation by particular students, or preferences established by the teacher, and/or the like.

Alternatively, the user might be one of a public speaker, a presenter, a celebrity, or a politician, and/or the like, while the individuals present within the first space might be one of audience members, fans, press members, or citizens, and/or the like. In such cases, the computing system might track which individual has questions for the user; and might generate a list of questions by identified individuals based at least in part on one or more of order of questions raised by the individuals, number of questions raised by particular individuals, or preferences established by the user, and/or the like.

The various embodiments address issues with typical classroom settings where student participation is used to grade student performance or used to grade the students. Alternatively, the various embodiments also address issues in other situations, including, but not limited to, conference settings, presentations, press conferences, etc. These and other aspects of the voice monitoring and tracking of participants in group settings are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, crowd tracking technology, crowd monitoring technology, individual tracking technology, individual monitoring technology, teacher assist technology, speaker assist technology, and/or the like. In other aspects, certain embodiments, can improve the functioning of user equipment or systems themselves (e.g., crowd tracking systems, crowd monitoring systems, individual tracking systems, individual monitoring systems, teacher assist systems, speaker assist systems, etc.), for example, by receiving, with a computing system and from at least one audio sensor among one or more audio sensors disposed within a first space, voice signals corresponding to voices associated with individuals present within the first space; analyzing, with the computing system, the received voice signals to identify one or more individuals who are present within the first space; and presenting, with the computing system and within a user interface of a user device associated with a user, information regarding the identified one or more individuals to assist the user in coordinating discussions among the individuals present within the first space; and/or the like. In particular, to the extent any abstract concepts are present in the various embodiments, those concepts can be implemented as described herein by devices, software, systems, and methods that involve specific novel functionality (e.g., steps or operations), such as, receiving, with a computing system and from at least one audio sensor among one or more audio sensors disposed within a first space, voice signals corresponding to voices associated with individuals present within the first space; analyzing, with the computing system, the received voice signals to identify one or more individuals who are present within the first space; and presenting, with the computing system and within a user interface of a user device associated with a user, information regarding the identified one or more individuals to assist the user in coordinating discussions among the individuals present within the first space; and/or the like, to name a few examples, that extend beyond mere conventional computer processing operations. These functionalities can produce tangible results outside of the implementing computer system, including, merely by way of example, optimized tracking and monitoring of students, individuals, or group participants, and the like, and optimized systems for assisting teachers, presenters, or speakers, and the like, at least some of which may be observed or measured by customers and/or service providers.

In an aspect, a method might comprise receiving, with a computing system and from at least one audio sensor among one or more audio sensors disposed within a first space, voice signals corresponding to voices associated with individuals present within the first space; analyzing, with the computing system, the received voice signals to identify one or more individuals who are present within the first space; and presenting, with the computing system and within a user interface of a user device associated with a user, information regarding the identified one or more individuals to assist the user in coordinating discussions among the individuals present within the first space.

In some embodiments, the computing system might comprise at least one of a classroom computing system, a lecture room computing system, a conference hall computing system, an auditorium computing system, a sports arena computing system, a press conference computing system, a conference room computing system, a moderator computing system, a processor of a display device running a software application ("app"), a processor of the user device running an app, a server computer over a network, or a cloud-based computing system over a network, and/or the like. In some cases, the user device might comprise at least one of a tablet computer, a desktop computer, a laptop computer, a presenter computer, a conference room computer, an auditorium computer, a smart phone, a mobile phone, or a wearable device, and/or the like. In some instances, the one or more audio sensors might comprise a plurality of microphones distributed throughout the first space to optimize audio pickup within the first space.

According to some embodiments, the user might be a teacher and the individuals present within the first space might be students. The method might further comprise tracking, with the computing system, which students spoke what words and when and in response to which questions posed by the teacher. Alternatively, or additionally, the method might further comprise generating, with the computing system, a list of students in a participation list based at least in part on one or more of responses by the students, lack of participation by particular students, or preferences established by the teacher.

In some embodiments, the user might be one of a public speaker, a presenter, a celebrity, or a politician, and/or the like. In such cases, the individuals present within the first space might be one of audience members, fans, press members, or citizens, and/or the like. The method might further comprise tracking, with the computing system, which individual has questions for the user; and generating, with the computing system, a list of questions by identified individuals based at least in part on one or more of order of questions raised by the individuals, number of questions raised by particular individuals, or preferences established by the user.

According to some embodiments, the user might be a moderator or a group leader, and where the individuals present within the first space might be one of group participants, conference call participants, or collaborators, and/or the like. In some cases, the first space might comprise one of a classroom, a lecture hall, a convention hall, an auditorium, a sports arena (e.g., a stadium, a basketball court, a tennis court, a badminton court, hockey rink, a soccer pitch, etc.), a press conference space, or a conference room, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from at least one audio sensor among one or more audio sensors disposed within a first space, voice signals corresponding to voices associated with individuals present within the first space; analyze the received voice signals to identify one or more individuals who are present within the first space; and present, within a user interface of a user device associated with a user, information regarding the identified one or more individuals to assist the user in coordinating discussions among the individuals present within the first space.

In some embodiments, the apparatus might comprise at least one of a classroom computing system, a lecture room computing system, a conference hall computing system, an auditorium computing system, a sports arena computing system, a press conference computing system, a conference room computing system, a moderator computing system, a processor of a display device running a software application ("app"), a processor of the user device running an app, a server computer over a network, or a cloud-based computing system over a network, and/or the like. In some cases, the user device might comprise at least one of a tablet computer, a desktop computer, a laptop computer, a presenter computer, a conference room computer, an auditorium computer, a smart phone, a mobile phone, or a wearable device, and/or the like. In some instances, the one or more audio sensors might comprise a plurality of microphones distributed throughout the first space to optimize audio pickup within the first space.

According to some embodiments, the user might be a teacher and the individuals present within the first space might be students. Alternatively, the user might be one of a public speaker, a presenter, a celebrity, or a politician, and wherein the individuals present within the first space are one of audience members, fans, press members, or citizens, and/or the like. Alternatively, the user might be a moderator or a group leader, and wherein the individuals present within the first space might be one of group participants, conference call participants, or collaborators, and/or the like. In some embodiments, the first space might comprise one of a classroom, a lecture hall, a convention hall, an auditorium, a sports arena (e.g., a stadium, a basketball court, a tennis court, a badminton court, hockey rink, a soccer pitch, etc.), a press conference space, or a conference room, and/or the like.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from at least one audio sensor among one or more audio sensors disposed within a first space, voice signals corresponding to voices associated with individuals present within the first space; analyze the received voice signals to identify one or more individuals who are present within the first space; and present, within a user interface of a user device associated with a user, information regarding the identified one or more individuals to assist the user in coordinating discussions among the individuals present within the first space.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing voice monitoring and tracking, and, more particularly, to methods, systems, and apparatuses for implementing voice monitoring and tracking of participants in group settings, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing voice monitoring and tracking of participants in group settings, in accordance with various embodiments.

In the non-limiting embodiment of FIG. 1, system 100 might comprise a computing system 105*a* and corresponding database(s) 110*a*. In some embodiments, the computing system 105*a* might include, without limitation, at least one of a classroom computing system, a lecture room computing system, a conference hall computing system, an auditorium computing system, a sports arena computing system, a press conference computing system, a conference room computing system, a moderator computing system, a processor of a display device running a software application ("app"), or a processor of the user device running an app, and/or the like.

System 100 might further comprise a user 115 and a user device 120 associated with the user 115. In some instances, the user 115 might include, without limitation, one of a teacher, a public speaker, a presenter, a celebrity, a politician, a moderator, or a group leader, and/or the like. In some cases, the user device 120 might include, but is not limited to, at least one of a tablet computer, a desktop computer, a laptop computer, a presenter computer, a conference room computer, an auditorium computer, a smart phone, a mobile phone, or a wearable device, and/or the like. According to some embodiments, the user device 120 might include a digital display unit ("DDU") or other display device. In some cases, the user device 120 might also include or incorporate a microphone (which might be configured to be replaceable if it fails).

System 100 might further comprise one or more audio sensors 125a-125n (collectively, "audio sensors 125" or the like) and a plurality of individuals 130a-130n (collectively, "individuals 130" or the like). In some instances, the audio sensors 125 might include, without limitation, microphones, or the like. In some embodiments, the audio sensors 125 might include, but are not limited to, sensors with far-field voice recognition functionalities. In some cases, the individuals 130 might include, without limitation, one of students, audience members, fans, press members, citizens, group participants, conference call participants, or collaborators, and/or the like. According to some embodiments, the computing system 105a, the database(s) 110a, the user 115, the user device 120, the audio sensors 125, and the plurality of individuals 130 might be located within a first space 135. In some cases, the first space 135—which might be any suitable indoor, outdoor, covered yet open spaces in which individuals 130 may be disposed during classes, meetings, gatherings, or events, or the like—might include, but is not limited to, one of a classroom, a lecture hall, a convention hall, an auditorium, a sports arena (e.g., a stadium, a basketball court, a tennis court, a badminton court, hockey rink, a soccer pitch, etc.), a press conference space, or a conference room, and/or the like. In some instances, the one or more audio sensors 125 might include, without limitation, a plurality of microphones distributed throughout the first space 135 to optimize audio pickup within the first space 135. In some cases, the computing system 105a and/or the user device 120 might include AI-enabled natural language processing functionalities. In some embodiments, software for the user device 120 might generate a list of the individuals 130 present in the first space 135 and might change the order of the listed individuals 130 based on the AI-enabled input. In some instances, generating the list of the individuals 130 present in the first space 135 might be performed based at least in part on one or more of responses to prompts for the individuals to self-identify each day or each time each individual enters the first space 135, audio analysis of the voice of each individual in the first space 135, video or image analysis of the face or other characteristics of each individual in the first space 135, analysis of the roll-call list (e.g., class registration information, conference or workshop registration information, press corps registration information, or participant registration information, and/or the like), and/or the like. By requiring individuals to self-identify each day or each time each individual enters the first space 135, the system 100 would be able to identify individuals despite one or more of seat changes by the individuals, the individuals having a cold, voice changes of the individuals due to the individuals reaching puberty or due to injury, or presence of interfering sounds, and/or the like.

System 100 might further comprise remote computing system 105b and corresponding database(s) 110b that are communicatively coupled to the computing system 105a via network(s) 140. The remote computing system 105b might include, but is not limited to, at least one of a server computer over a network or a cloud-based computing system over a network, and/or the like. The network(s) 140 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 140 might include an access network of the service provider (e.g., an Internet service provider ("ISP")). In another embodiment, the network(s) 140 might include a core network of the service provider, and/or the Internet.

System 100 might further comprise AI-enabled natural language processing system 145 (optional), which either might be part of computing system 105a or 105b (not shown), or might be a separate system component that might communicatively couple to the computing system 105a or 105b via network(s) 140. The AI-enabled natural language processing system 145 might enable improved voice, speech, and/or language recognition capabilities as applied to voice signals captured, sensed, or recorded by the audio sensors 125. System 100 might further comprise one or more cameras 150 (optional) that are disposed within first space 135 to capture images and/or video data of the individuals 130 that are within the point of view ("POV") or view 150a (as depicted in FIG. 1, or the like). In some instances, the captured images and/or video data might be analyzed by the computing system 105a and/or 105b to supplement and/or complement the voice, speech, and/or language recognition capabilities of the audio sensors 125, by using the captured images and/or video data to perform individual identification (in conjunction with voice recognition), mouth movement monitoring (in conjunction with speech recognition), and/or body movement tracking (including tracking of facial movement, mouth movement, hand movement, and/or torso movement, etc.; in conjunction with language recognition), and/or the like.

In operation, the computing system 105a, the remote computing system 105b, or the user device 120 (collectively, "computing system" or the like) might receive, from at least one audio sensor 125 among the one or more audio sensors 125a-125n disposed within the first space 135, voice signals corresponding to voices associated with individuals 130 present within the first space 135. The computing system might analyze the received voice signals to identify one or more individuals 130 who are present within the first space 135. The computing system might present, within a user interface of the user device 120 associated with the user 115, information regarding the identified one or more individuals 130 to assist the user 115 in coordinating discussions among the individuals 130 present within the first space 135.

According to some embodiments, the user 115 might be a teacher and the individuals 130a-130n present within the first space 135 might be students. In such cases, the computing system might track which students spoke what words and when and in response to which questions posed by the teacher. Alternatively, or additionally, the computing system might generate a list of students in a participation list based at least in part on one or more of responses by the students, lack of participation by particular students, or preferences established by the teacher, and/or the like.

Alternatively, the user 115 might be one of a public speaker, a presenter, a celebrity, or a politician, and/or the like, while the individuals 130 present within the first space 135 might be one of audience members, fans, press members, or citizens, and/or the like. In such cases, the computing system might track which individual has questions for the user; and might generate a list of questions by identified individuals based at least in part on one or more of order of questions raised by the individuals, number of questions raised by particular individuals, or preferences established by the user, and/or the like.

In a non-limiting example, audio sensors and cameras disposed within and throughout a sports arena (e.g., a stadium, a basketball court, a tennis court, a badminton court, hockey rink, a soccer pitch, etc.) may be used to track or monitor fans within the sports arena to provide the fans with functionalities and features, including, but not limited to, allowing sports or concert fans to order food, drinks, or fan merchandize/memorabilia (where the audio sensors can track the audio orders and confirmation of such orders, while cameras may be used to confirm the seats from which the fans have placed the orders, etc.); allowing sports fans to provide opportunities to dispute play calls by game officials (e.g., umpires or referees, etc.) or to raise issues with game play that was missed by the game officials; allowing sports fans to compete for who cheers on the home team in the best or most enthusiastic manner (which may be rewarded by the home team as desired by the home team); allowing sports fans communicate with, or directly cheer on, particular players or coaches, via a human or AI intermediary, while the computing system filters out insults and derogatory comments, etc.; allowing concert fans to communicate with, or directly cheer on, particular musical artists or other performers, via a human or AI intermediary, while the computing system filters out insults and derogatory comments, etc.; providing sports or concert fans with directions based on open questions by the fans for directions to seats, restrooms, food stores, and/or merchandize stores (which feature may be supplemented by use of speakers or display screens near the questioning fans); and/or the like.

In another non-limiting example, audio sensors and cameras disposed within a courtroom (in conjunction with the computing system or the like) may be used to track or monitor speech within the courtroom as well as identifying the speakers (e.g., the judge(s), each of one or more of the defense attorneys, each of one or more of the prosecutors or plaintiffs attorneys, each of the witnesses, the expert(s), the defendant(s), or the plaintiff(s), etc.). In this manner, the system might serve as assistance to a court reporter or stenographer, or might serve as a backup to regular court reporting. In courtrooms that do not have court reporters (due to budget issues or personnel fulfilment issues, or the like), the system might fill the role of a court reporter or stenographer by making and keeping a record of who spoke what words within the courtroom. Further, for teleconferencing courtrooms, where a courtroom in one jurisdiction is linked with another courtroom(s) in another jurisdiction(s) (e.g., where one or more parties are located at a corner of a state and can only attend the local courthouse rather than the main courthouse in a main city or capital city, or the like, where the judge or other parties might be located; in some cases, the judge might be located at the remote courthouse), the system might enable the parties at each location to receive or view information regarding the speakers at the other location(s) and what each of those speakers is saying.

These and other functions of the system 100 (and its components) are described in greater detail below with respect to FIGS. 2-4.

Figure 2:
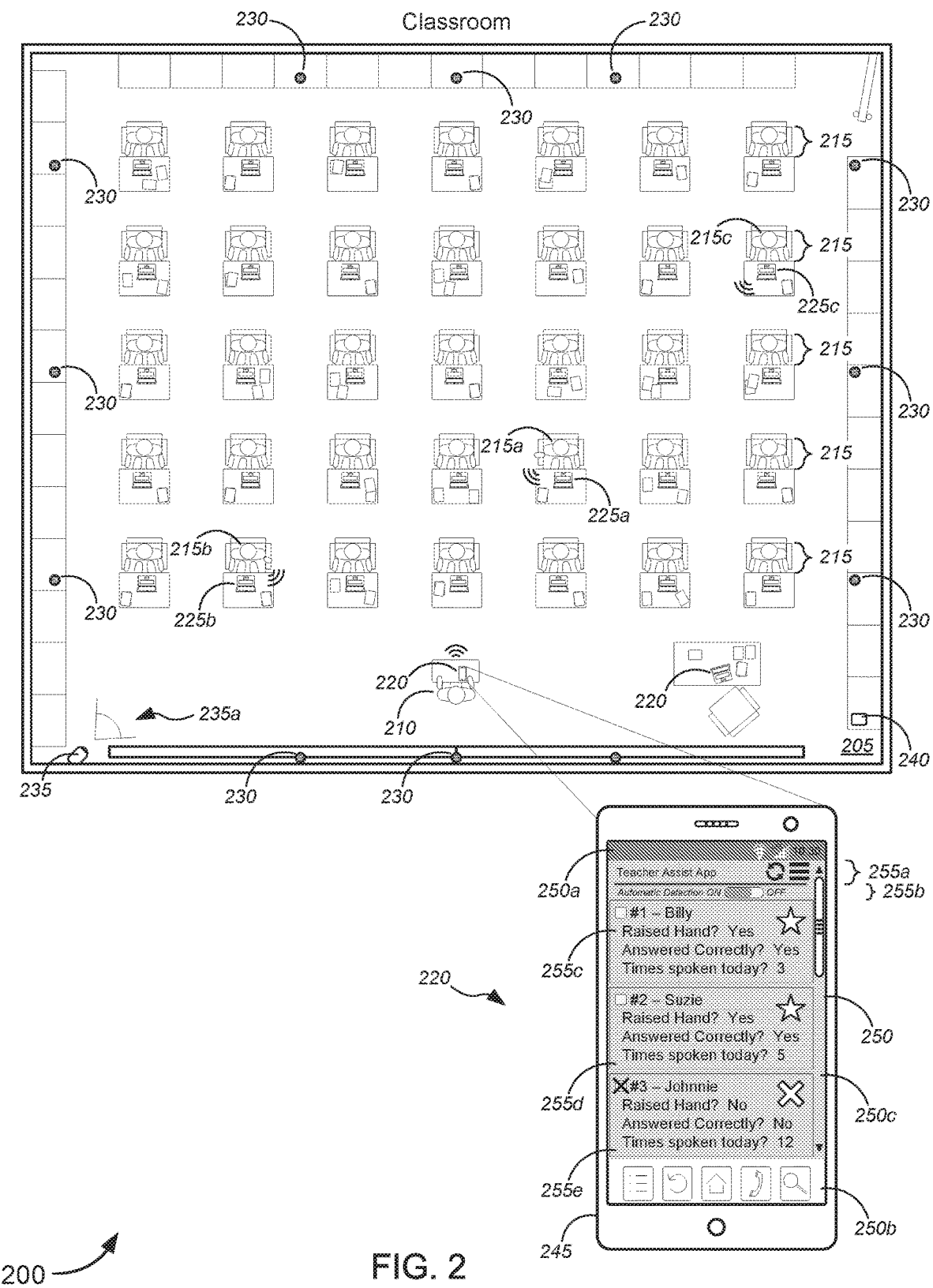
FIG. 2 is a schematic diagram illustrating a non-limiting example of a classroom in which voice monitoring and tracking of students in group settings may be implemented, in accordance with various embodiments.

FIG. 2 is a schematic diagram illustrating a non-limiting example 200 of a classroom in which voice monitoring and tracking of students in group settings may be implemented, in accordance with various embodiments.

In the non-limiting embodiment of FIG. 2, system 200 might comprise a classroom 205, a teacher 210, a plurality of students 215, a user device(s) 220 associated with the teacher 210, user devices 225 associated with the students 215, one or more audio sensors 230, one or more cameras 235, and/or a computing system 240, and/or the like. In some cases, the user device(s) 220 might each include, without limitation, at least one of a tablet computer, a desktop computer, a laptop computer, a presenter computer, a conference room computer, an auditorium computer, a smart phone, a mobile phone, or a wearable device, and/or the like. The user devices 225 might each include, but is not limited to, at least one of a tablet computer, a smart phone, a mobile phone, or a wearable device, and/or the like. As shown in FIG. 2, the one or more audio sensors 230 might comprise a plurality of devices comprising microphones, the plurality of devices being distributed throughout the classroom 205 in positions that would facilitate audio reception within the classroom 205 or to optimize audio pickup within the classroom 205. In some cases, the one or more cameras 235 might capture images and/or video data of the students 215 that are within the point of view ("POV") or view 235a (as depicted in FIG. 2, or the like). In some instances, the captured images and/or video data might be analyzed by the computing system 240 to supplement and/or complement the voice, speech, and/or language recognition capabilities of the audio sensors 230, by using the captured images and/or video data to perform individual identification (in conjunction with voice recognition), mouth movement monitoring (in conjunction with speech recognition), and/or body movement tracking (including tracking of facial movement, mouth movement, hand movement, and/or torso movement, etc.; in conjunction with language recognition), and/or the like.

According to some embodiments, the user device 220 might comprise a housing 245, a display screen 250, and a teacher assist software application ("app") 255 running on the user device 220 and being displayed on the display screen 250. Alternative to the app 255, a web portal (not shown) might be implemented. In the non-limiting example of FIG. 2, the display screen 250 might comprise a header portion 250a, a quick task portion 250b, and a main display portion 250c. In the header portion 250a might be displayed at least one of time of day, cellular communications signal strength icon, and/or wireless communications signal strength icon, or the like. In the quick task portion 250b might be displayed at least one of a main menu button, a back or undo button, a home button, a call button, a search button, and/or the like. In the main display portion 250c might be displayed the teacher assist app 255, which might include, but is not limited to, at least one of an app header portion 255a (which might include, without limitation, at least one of an app title, a refresh button, or a menu icon, and/or the like), an automatic detection option portion 255b (which might provide the user or teacher 210 with the option to turn on or off automatic detection and/or recognition of voices of individuals, automatic detection and/or recognition of words (and when said words are detected) spoken by the identified individuals, or automatic tracking or monitoring of words spoken by which individuals and when, or the like), or one or more information portions 255c-255e for corresponding one or more students identified by the computing system 240 or the user device 220, and/or the like. The user device 220 might be disposed within the classroom 205, in proximity to the user or teacher 210.

In operation, the computing system 240 or the user device 220 (collectively, "computing system" or the like) might receive, from at least one audio sensor 230 among the one or more audio sensors 230 disposed within the classroom 205 (i.e., first space), voice signals corresponding to voices associated with students 215 (i.e., individuals) present within the classroom 205. The computing system might analyze the received voice signals to identify one or more students 215 who are present within the classroom 205. The computing system might present, within a user interface of the user device 220 associated with the user or teacher 210, information regarding the identified one or more students 215 to assist the user or teacher 210 (which might include, but is not limited to, a preschool teacher, an elementary teacher, a junior high (or middle) school teacher, a senior high school teacher, a college teacher, or a university teacher, and/or the like) in coordinating discussions among the students 215 present within the classroom 205.

According to some embodiments, the computing system might track which students 225 spoke what words and when and in response to which questions posed by the teacher 210. Alternatively, or additionally, the computing system might generate a list of students in a participation list based at least in part on one or more of responses by the students, lack of participation by particular students, or preferences established by the teacher, and/or the like.

For example, as shown in FIG. 2, the computing system might identify the first student 215a to respond to one of the questions posed by the user or teacher 210 (in this case, "Billy" as denoted in the first information portion 255c of the teacher assist app 255 as depicted in the display screen 250 of the user device 220 associated with the user or teacher 210). In some cases, the computing system might do so by using voice and/or image data captured by at least one of the audio sensors 230, the camera(s) 235, or the first student's user device 225a, and/or the like. As also shown in the first information portion 255c, the computing system had determined that the first student (i.e., Billy) had raised his hand when providing his answer to the question by the teacher 210, that the first student had answered the question correctly, and that the first student had spoken three times that day. As also shown in FIG. 2, the computing system might identify the second student 215b to respond to the one of the questions posed by the user or teacher 210 (in this case, "Suzie" as denoted in the second information portion 255d of the teacher assist app 255 as depicted in the display screen 250 of the user device 220 associated with the user or teacher 210). In some cases, the computing system might do so by using voice and/or image data captured by at least one of the audio sensors 230, the camera(s) 235, or the second student's user device 225b, and/or the like. As also shown in the second information portion 255d, the computing system had determined that the second student (i.e., Suzie) had raised her hand when providing her answer to the question by the teacher 210, that the second student had answered the question correctly, and that the second student had spoken five times that day. As further shown in FIG. 2, the computing system might identify the third student 215c to respond to the one of the questions posed by the user or teacher 210 (in this case, "Johnnie" as denoted in the third information portion 255e of the teacher assist app 255 as depicted in the display screen 250 of the user device 220 associated with the user or teacher 210). In some cases, the computing system might do so by using voice and/or image data captured by at least one of the audio sensors 230, the camera(s) 235, or the third student's user device 225c, and/or the like. As also shown in the third information portion 255e, the computing system had determined that the third student (i.e., Johnnie) had failed to raise his hand when providing his answer to the question by the teacher 210, that the third student had answered the question incorrectly, and that the third student had spoken twelve times that day.

In some embodiments, the computing system might also track which student 215 has questions for the user or teacher 210; and might generate a list of questions by identified students 215 based at least in part on one or more of order of questions raised by the students 215, number of questions raised by particular students 215, or preferences established by the user or teacher 210, and/or the like. Alternatively, or additionally, the computing system might also track which student 215 has answers for questions posed by the user or teacher 210; and might generate a list of answers by identified students 215 based at least in part on one or more of order of answers provided by the students 215, number of answers provided by particular students 215, number of correct or incorrect answers provided by the particular students 215, or preferences established by the user or teacher 210, and/or the like.

In some aspects, a situation might arise in which teachers (from preschool to elementary, to high school, to college or university teachers or instructors) might use student participation to evaluate student performance and/or student grades, but might have trouble tracking student participation and/or evaluating student performance. For example, in some cases, "getting speak points in class" can be unfair and biased. Such problems might depend on where the student sits and might be called upon to answer questions, etc., and/or the teacher may hear better those with louder voices and personalities. The solution might utilize the various embodiments described herein. In particular, audio sensors or microphones distributed throughout the classroom (including at least one audio sensor or microphone disposed at the teacher's desk or podium) might be used. Students might sit in their regular seats and might speak their names, then read aloud to train the AI, each student might continue reading until the system beeps, flashes, or otherwise indicates when the AI reaches a predetermined confidence level (e.g., 95% confidence level, or the like). Speaker participation recognition might operate differently based on whether student call out is allowed by the teacher or not (i.e., whether or not the student may be allowed to call out the answer without the teacher calling on the student). If call out is allowed, the AI or the computing system might credit participation based on each voice, even if multiple voices overlap. If call out is not allowed, the AI or the computing system might only credit the student (or speaker) if the teacher first mentions the student's name. The user device or DDU associated with the teacher (e.g., disposed at the teacher's desk or podium, or the like) might list student names beginning with the one who spoke least recently (or least often) and ending with the one who spoke most recently (or most often). The teacher might choose to call upon the name of the student listed at the top, or based on a combination of those who raise their hands and the names high on the list. During classroom usage, the AI, computing system, or DDU might allow the teacher to detect both the number of words spoken and duration of speech (e.g., from last word to first word within a certain minimum timeframe—e.g., 1 minute, 2 minutes, 3 minutes, 4 minutes, 5 minutes, 10 minutes, 15 minutes, 30 minutes, 45 minutes, 60 minutes, 75 minutes, 90 minutes, etc, but not limited to, these duration). The AI, computing system, or DDU might set participation threshold, where speaking points might be awarded based on a minimum word count ($w_{actual} > w_{min}$) or minimum time ($t_{actual} > t_{min}$) duration.

As a result of the above-mentioned functionalities, speaking points might be awarded to students based on their participation. Teachers might be encouraged to call on those who haven't recently participated, helping avoid bias or unfairness. The use of the microphones distributed through the classroom and the speaker participation recognition based on call out being allowed or not (and perhaps also the use of camera(s) in the classroom) might enable student participation tracking whether or not the teacher allows the student to "call out" the answer without raising the student's hand. If not, then speaking shouldn't count positively toward student participation. To address the problem of whether or not students are not called upon due to unconscious teacher bias or due to less visible students sitting further back in the classroom, the system might use the microphones distributed through the classroom and the use of user device or DDU associated with the teacher listing student names beginning with the one who spoke least recently (or least often) and ending with the one who spoke most recently (or most often). The use of the microphones distributed through the classroom and the speaker participation recognition based on call out being allowed or not (and perhaps also the use of camera(s) in the classroom) might track students who speak out of turn or otherwise disrupt the class, and might count against student participation and/or might otherwise count against the offending students. For students or parents of students who object to a voice recognition system in the classroom, such privacy concerns might be mitigated through assurances (and/or automatic systems set in place) that data will be deleted at the end of the semester or end of the school year, or the like. The various embodiments could also be expanded to provide additional assistance or services to the teacher over time, including, but not limited to, task list functionalities, lesson plan generation/modification functionalities, teleprompter-like functionalities, etc.

In various embodiments, the system might track instructions or changes to settings from the teacher, based on the voice tracking of the teacher (e.g., the teacher telling the students that for the next question(s) student call out is allowed (or not allowed), the teacher telling the class how much the correct answer(s) to the next question(s) are worth in terms of participation, the teacher providing the answer(s) after the students have provided their answers (and using post-analysis to determine who correctly answered the teacher's question(s)), etc.). In some cases, the system tracking how many students got the answer to each question correct or incorrect. If a predetermined number or percentage of wrong answers to a question are provided by the students, the system might provide a notification as such to the teacher, which might allow the teacher the option to address this issue or to lead a discussion to explain why a significant number of students got the answer wrong. The system might also reward student participation points based at least in part on one or more of frequency, duration, number of words, number of correct answers, attempts are answering correctly, etc. The student participation tracking system might allow the teacher (or other school administrator), students, or parents to log and review the students' participation in class. The system might display reports to show how individual students or the class as a whole are doing in terms of class participation. The system might also provide the teacher with feedback on lessons to help the teacher to determine if the students are on the right track or not.

Figure 3:
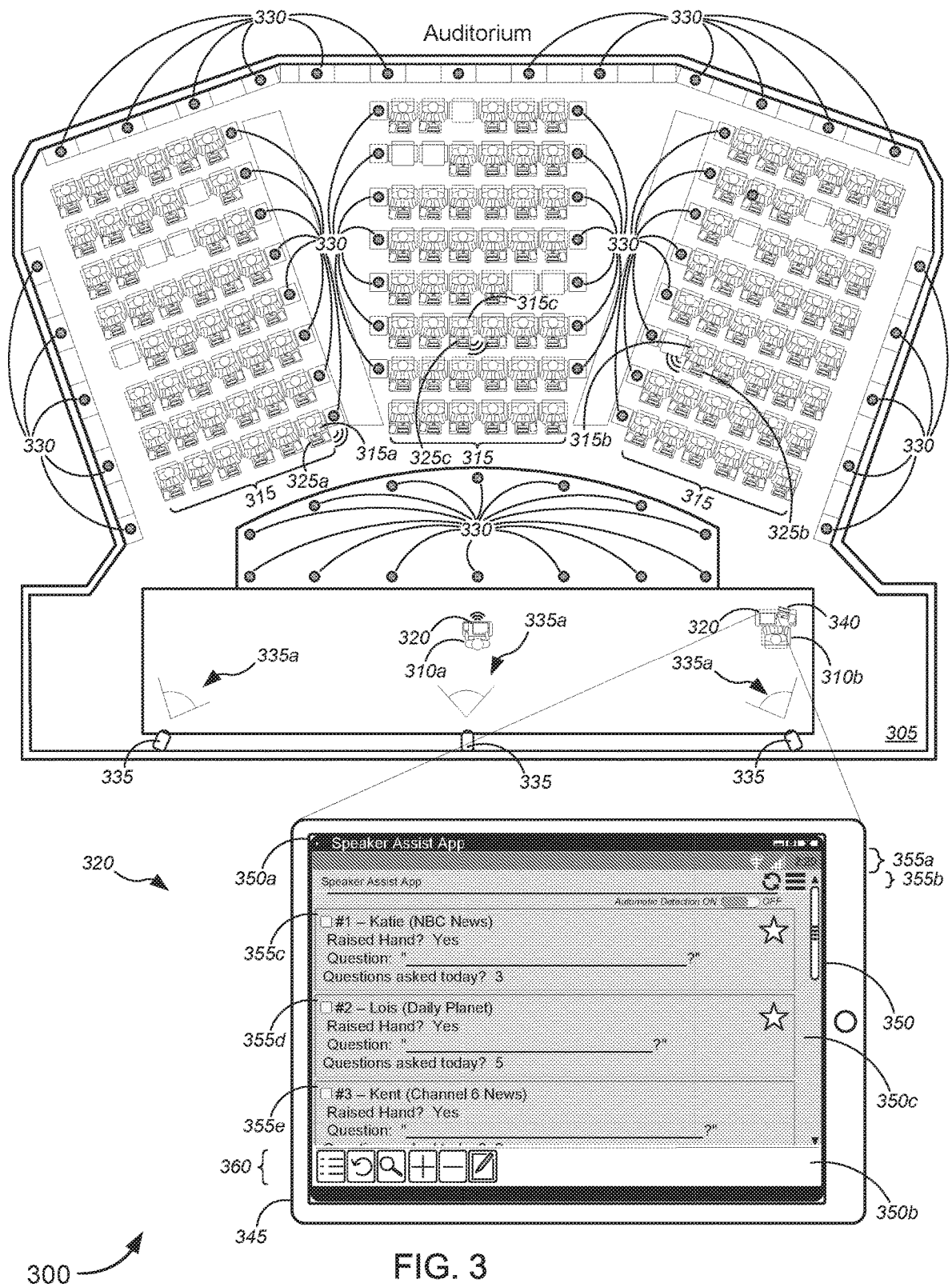
FIG. 3 is a schematic diagram illustrating another non-limiting example of an auditorium in which voice monitoring and tracking of participants in group settings may be implemented, in accordance with various embodiments.

FIG. 3 is a schematic diagram illustrating another non-limiting example 300 of a first space (in this case, an auditorium) in which voice monitoring and tracking of participants in group settings may be implemented, in accordance with various embodiments.

In the non-limiting embodiment of FIG. 3, system 300 might comprise an auditorium 305, a speaker 310a, a moderator 310b, a plurality of individuals 315, a user device(s) 320 associated with the speaker 310a, a user device(s) 320 associated with the moderator 310b, user devices 325 associated with the individuals 315, one or more audio sensors 330, one or more cameras 335, and/or a computing system 340, and/or the like. In some cases, the user devices 320 might each include, without limitation, at least one of a tablet computer, a desktop computer, a laptop computer, a presenter computer, a conference room computer, an auditorium computer, a smart phone, a mobile phone, or a wearable device, and/or the like. The user devices 325 might each include, but is not limited to, at least one of a tablet computer, a smart phone, a mobile phone, or a wearable device, and/or the like. As shown in FIG. 3, the one or more audio sensors 330 might comprise a plurality of devices comprising microphones, the plurality of devices being distributed throughout the auditorium 305 in positions that would facilitate audio reception within the auditorium 305 or to optimize audio pickup within the auditorium 305. In some cases, the one or more cameras 335 might each capture images and/or video data of the individuals 315 that are within the point of view ("POV") or view 335a (as depicted in FIG. 3, or the like). In some instances, the captured images and/or video data might be analyzed by the computing system 340 to supplement and/or complement the voice, speech, and/or language recognition capabilities of the audio sensors 330, by using the captured images and/or video data to perform individual identification (in conjunction with voice recognition), mouth movement monitoring (in conjunction with speech recognition), and/or body movement tracking (including tracking of facial movement, mouth movement, hand movement, and/or torso movement, etc.; in conjunction with language recognition), and/or the like.

According to some embodiments, the user device 320 might comprise a housing 345, a display screen 350, and a speaker assist software application ("app") 355 running on the user device 320 and being displayed on the display screen 350. Alternative to the app 355, a web portal (not shown) might be implemented. In the non-limiting example of FIG. 3, the display screen 350 might comprise a header portion 350a, a quick task portion 350b, and a main display portion 350c. In the header portion 350a might be displayed at least one of time of day, cellular communications signal strength icon, and/or wireless communications signal strength icon, or the like. In the quick task portion 350b might be displayed at least one of a main menu button, a back or undo button, a home button, a call button, a search button, and/or the like. In the main display portion 350c might be displayed the speaker assist app 355, which might include, but is not limited to, at least one of an app header portion 355a (which might include, without limitation, at least one of an app title, a refresh button, or a menu icon, and/or the like), an automatic detection option portion 355b (which might provide the user 310 (or speaker 310a or moderator 310b) with the option to turn on or off automatic detection and/or recognition of voices of individuals, automatic detection and/or recognition of words (and when said words are detected) spoken by the identified individuals, or automatic tracking or monitoring of words spoken by which individuals and when, or the like), or one or more information portions 355c-355e for corresponding one or more individuals identified by the computing system 340 or the user device 320, and/or the like. The user device 320 might be disposed within the auditorium 305, in proximity to the user 310 (or speaker 310a or moderator 310b).

In operation, the computing system 340 or the user device 320 (collectively, "computing system" or the like) might receive, from at least one audio sensor 330 among the one or more audio sensors 330 disposed within the auditorium 305 (i.e., first space 305), voice signals corresponding to voices associated with individuals 315 present within the auditorium 305. The computing system might analyze the received voice signals to identify one or more individuals 315 who are present within the auditorium 305. The computing system might present, within a user interface of the user device 320 associated with the user 310, information regarding the identified one or more individuals 315 to assist the user 310 in coordinating discussions among the individuals 315 present within the auditorium 305. In particular, the speaker 310a or the moderator 310b might coordinate discussions between the speaker 310a and the individuals 315 in the audience of the auditorium 305.

According to some embodiments, the computing system might track which individuals 325 spoke what words and when and in response to the words spoken by the speaker 310a or moderator 310b. Alternatively, or additionally, the computing system might generate a list of individuals in a participation list based at least in part on one or more of responses or questions by the individuals, amount of participation by particular individuals, or preferences established by the speaker 310a or moderator 310b, and/or the like.

For example, as shown in FIG. 3, the computing system might identify the first individual 315a who has posed questions to the user or speaker 310a (in this case, "Katie of NBC News" as denoted in the first information portion 355c of the speaker assist app 355 as depicted in the display screen 350 of the user device 320 associated with the user or speaker 310a or moderator 310b). In some cases, the computing system might do so by using voice and/or image data captured by at least one of the audio sensors 330, the camera(s) 335, or the first individual's user device 325a, and/or the like. As also shown in the first information portion 355c, the computing system had determined that the first individual (i.e., Katie of NBC News) had raised her hand when providing her question(s) to the speaker 310a, determined and converted from speech into text the question(s) posed by the first individual, and that the first individual had spoken three times that day. As also shown in FIG. 3, the computing system might identify the second individual 315b who has posed questions to the user or speaker 310a (in this case, "Lois of the Daily Planet" as denoted in the second information portion 355d of the speaker assist app 355 as depicted in the display screen 350 of the user device 320 associated with the user or speaker 310a or moderator 310b). In some cases, the computing system might do so by using voice and/or image data captured by at least one of the audio sensors 330, the camera(s) 335, or the second individual's user device 325b, and/or the like. As also shown in the second information portion 355d, the computing system had determined that the second individual (i.e., Lois of the Daily Planet) had raised her hand when providing her question(s) to the speaker 310a, determined and converted from speech into text the question(s) posed by the second individual, and that the second individual had spoken five times that day. As further shown in FIG. 3, the computing system might identify the third individual 315c who has posed questions to the user or speaker 310a (in this case, "Kent of Channel 6 News" as denoted in the third information portion 355e of the speaker assist app 355 as depicted in the display screen 350 of the user device 320 associated with the user or speaker 310a or moderator 310b). In some cases, the computing system might do so by using voice and/or image data captured by at least one of the audio sensors 330, the camera(s) 335, or the third individual's user device 325c, and/or the like. As also shown in the third information portion 355e, the computing system had determined that the third individual (i.e., Kent of Channel 6 News) had raised his hand when providing his question(s) to the speaker 310a, and determined and converted from speech into text the question(s) posed by the third individual.

Alternatively, or additionally, the user 310 might be one of a public speaker, a presenter, a celebrity, or a politician, and/or the like, while the individuals 315 present within the auditorium 305 might be one of audience members, fans, press members, or citizens, and/or the like. In such cases, the computing system might track which individual has questions for the user; and might generate a list of questions by identified individuals based at least in part on one or more of order of questions raised by the individuals, number of questions raised by particular individuals, or preferences established by the user, and/or the like.

In some aspects, the system might track who among the individuals have participated. The system might filter those who have not asked questions recently (or not asked questions often), might filter out or push down in the list those who have asked questions recently (or have asked questions too often), might filter by news agencies or other media outlets, might filter by other priorities or characteristics, and/or the like. In some embodiments, the system might be used for organizations such as the United Nations, where representatives of countries may be tracked and their comments, questions, or answers, etc. may be logged and recorded (and may be provided with automatic language translation for presentation on the user devices of the other representatives in the native or selected languages set on such user devices).

The functionalities of classroom embodiments of system 200 of FIG. 2 that are not expressly described above with respect to system 300 of FIG. 3 might, in some embodiments, otherwise be implemented for the embodiment of system 300 of FIG. 3.

Figure 4A:
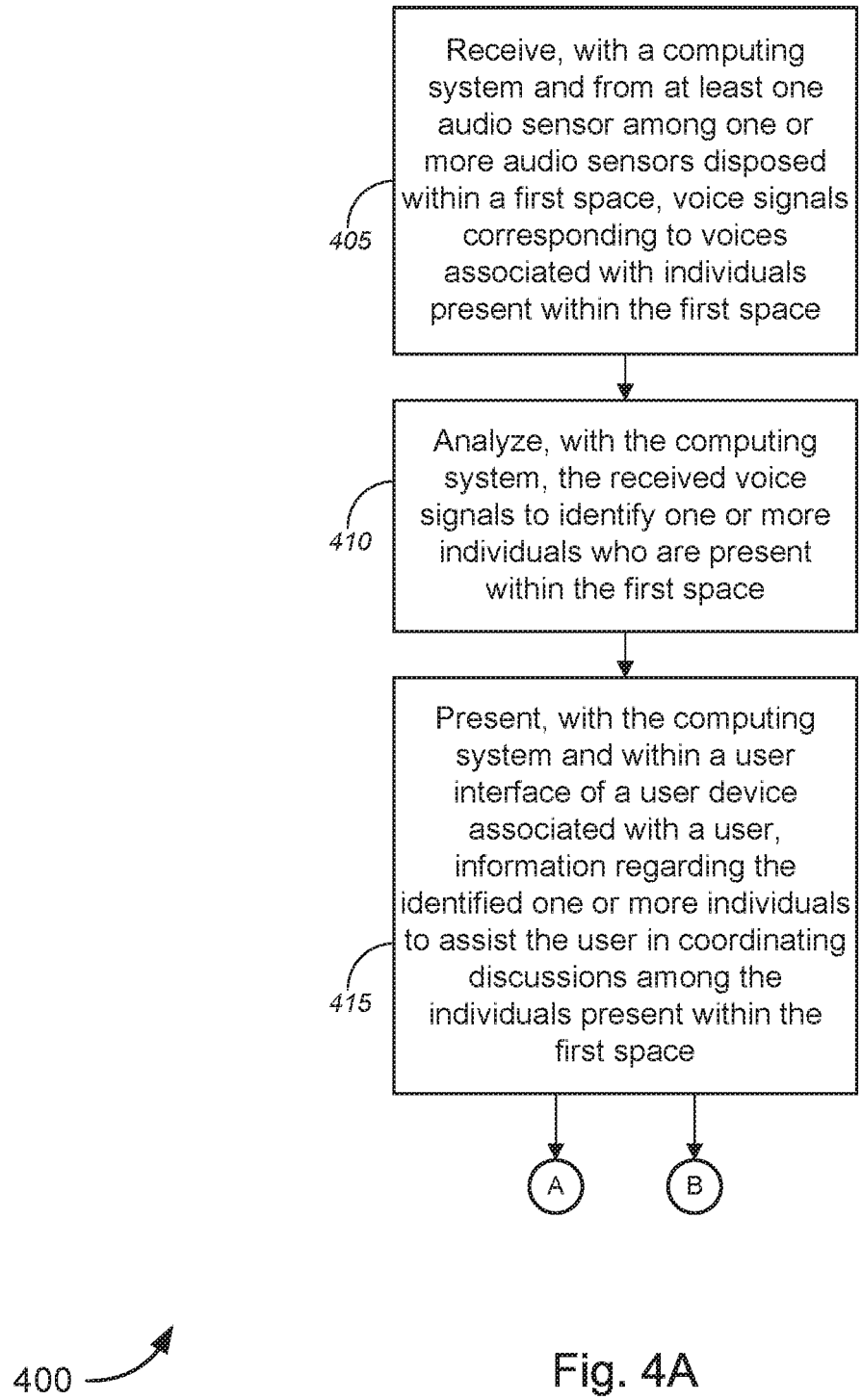
FIGS. 4A-4C are flow diagrams illustrating a method for implementing voice monitoring and tracking of participants in group settings, in accordance with various embodiments.
Figures 4B, 4C:
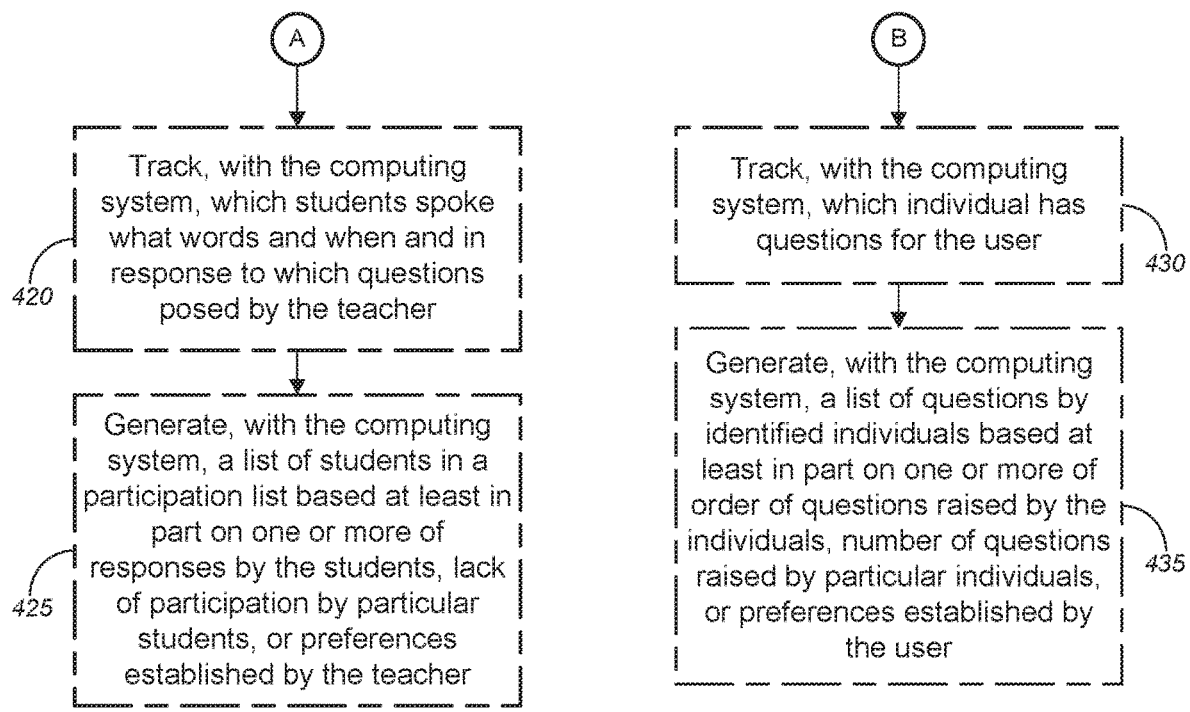

FIGS. 4A-4C (collectively, "FIG. 4") are flow diagrams illustrating a method 400 for implementing voice monitoring and tracking of participants in group settings, in accordance with various embodiments. Method 400 of FIG. 4A continues onto FIG. 4B following the circular marker denoted, "A," or continues onto FIG. 4C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, might comprise receiving, with a computing system and from at least one audio sensor among one or more audio sensors disposed within a first space, voice signals corresponding to voices associated with individuals present within the first space. At block 410, method 400 might comprise analyzing, with the computing system, the received voice signals to identify one or more individuals who are present within the first space. Method 400 might further comprise presenting, with the computing system and within a user interface of a user device associated with a user, information regarding the identified one or more individuals to assist the user in coordinating discussions among the individuals present within the first space (block 415). Method 400 either might continue onto the process at optional block 420 in FIG. 4B following the circular marker denoted, "A," or might continue onto the process at optional block 430 in FIG. 4C following the circular marker denoted, "B."

In some embodiments, the computing system might include, without limitation, at least one of a classroom computing system, a lecture room computing system, a conference hall computing system, an auditorium computing system, a sports arena computing system, a press conference computing system, a conference room computing system, a moderator computing system, a processor of a display device running a software application ("app"), a processor of the user device running an app, a server computer over a network, or a cloud-based computing system over a network, and/or the like. In some cases, the user device might include, but is not limited to, at least one of a tablet computer, a desktop computer, a laptop computer, a presenter computer, a conference room computer, an auditorium computer, a smart phone, a mobile phone, or a wearable device, and/or the like. In some instances, the one or more audio sensors might include, without limitation, a plurality of microphones distributed throughout the first space to optimize audio pickup within the first space.

According to some embodiments, the user might be a teacher and the individuals present within the first space might be students. With reference to FIG. 4B (following the circular marker denoted, "A"), method 400 might comprise tracking, with the computing system, which students spoke what words and when and in response to which questions posed by the teacher (optional block 420). Alternatively, or additionally, method 400, at optional block 425, might comprise generating, with the computing system, a list of students in a participation list based at least in part on one or more of responses by the students, lack of participation by particular students, or preferences established by the teacher, and/or the like.

In some embodiments, the user might be one of a public speaker, a presenter, a celebrity, or a politician, and/or the like, while the individuals present within the first space might be one of audience members, fans, press members, or citizens, and/or the like. Referring to FIG. 4C (following the circular marker denoted, "B," from FIG. 4A), method 400 might further comprise tracking, with the computing system, which individual has questions for the user (optional block 430); and generating, with the computing system, a list of questions by identified individuals based at least in part on one or more of order of questions raised by the individuals, number of questions raised by particular individuals, or preferences established by the user, and/or the like (optional block 435).

In some cases, the user might be a moderator or a group leader, while the individuals present within the first space might be one of group participants, conference call participants, or collaborators, and/or the like. In some instances, the first space—which might be any suitable indoor, outdoor, covered yet open spaces in which individuals may be disposed during classes, meetings, gatherings, or events, or the like—might include, but is not limited to, one of a classroom, a lecture hall, a convention hall, an auditorium, a sports arena (e.g., a stadium, a basketball court, a tennis court, a badminton court, hockey rink, a soccer pitch, etc.), a press conference space, or a conference room, and/or the like.

Exemplary System and Hardware Implementation

Figure 5:
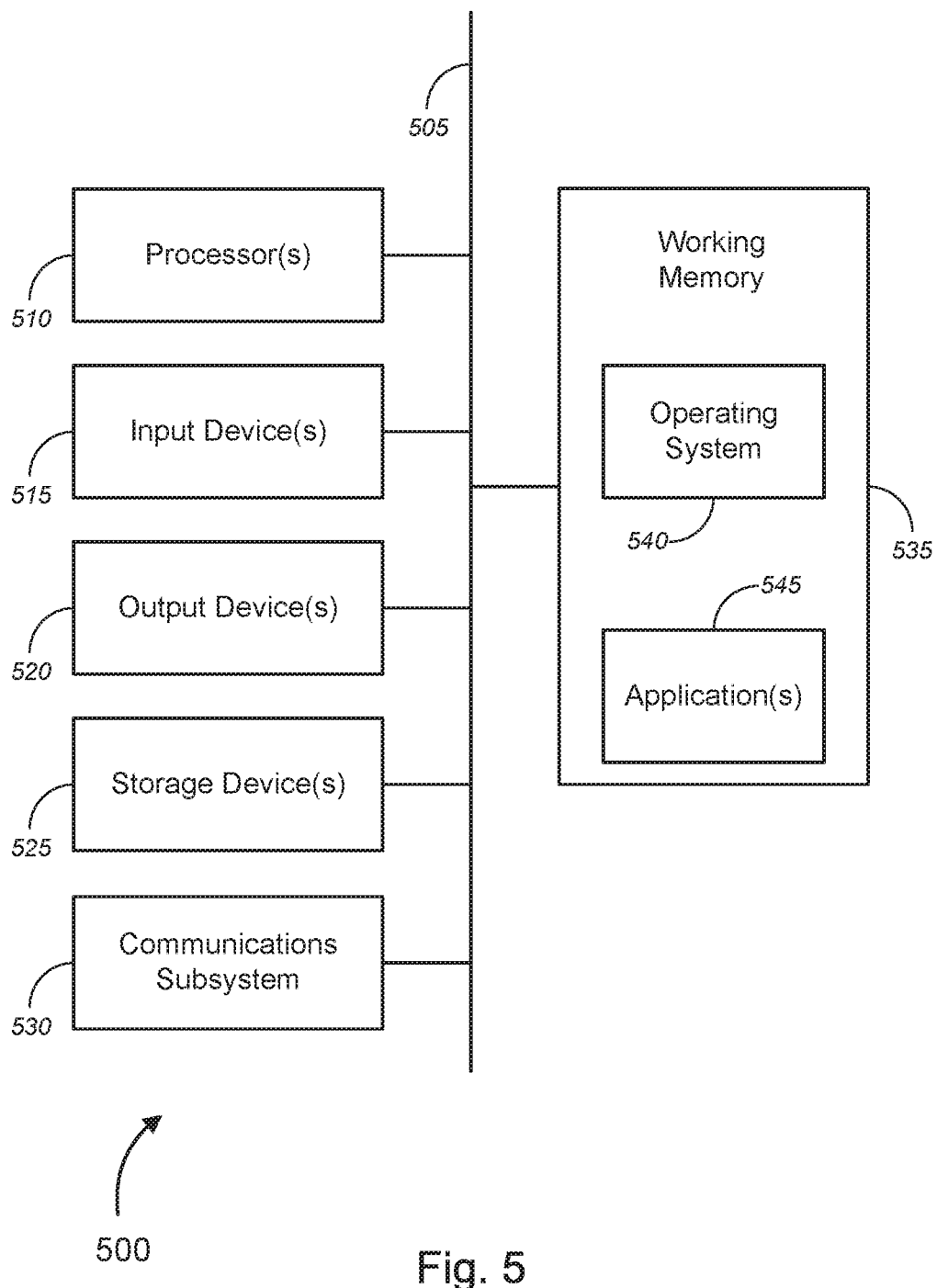
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105*a*, 240, and 340, user devices 120, 220, and 320, remote computing system 105*b*, and AI-enabled natural language processing system 145, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105*a*, 240, and 340, user devices 120, 220, and 320, remote computing system 105*b*, and AI-enabled natural language processing system 145, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
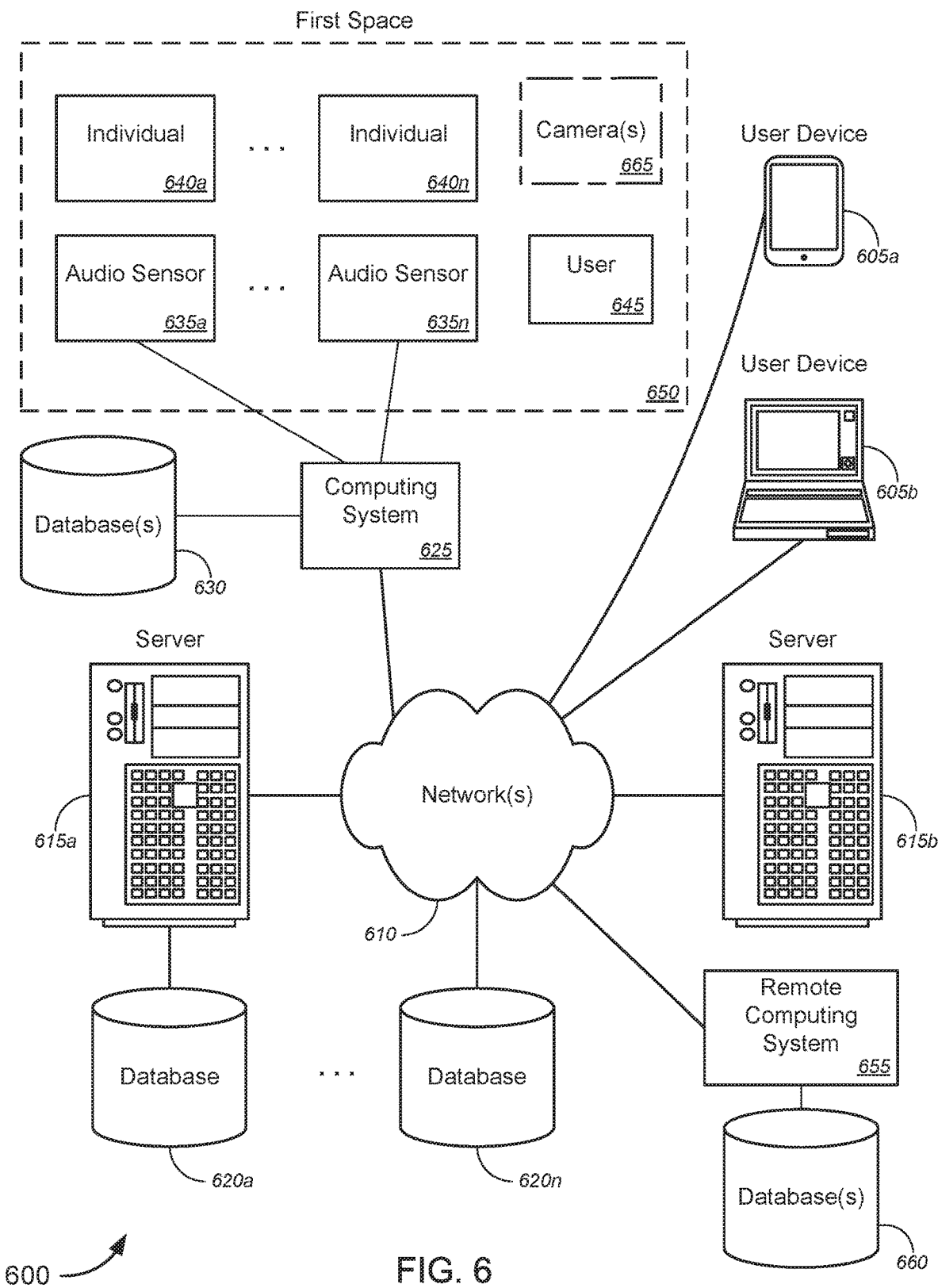
FIG. 6 is a block diagram illustrating a networked system of computers, computing systems, or system hardware architecture, which can be used in accordance with various embodiments.

As noted above, a set of embodiments comprises methods and systems for implementing voice monitoring and tracking, and, more particularly, to methods, systems, and apparatuses for implementing voice monitoring and tracking of participants in group settings. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 140 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing voice monitoring and tracking, and, more particularly, to methods, systems, and apparatuses for implementing voice monitoring and tracking of participants in group settings, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105a, 240, and 340 of FIGS. 1-3, or the like) and corresponding database(s) 630 (similar to database(s) 110a of FIG. 1, or the like). System 600 might further comprise one or more audio sensors 635a-635n (collectively, "audio sensors 635"; similar to audio sensors 125a-125n, 230, and 330 of FIGS. 1-3, or the like), one or more individuals 640a-640n (collectively, "individuals 640"; similar to individuals 130a-130n, 215, and 315 of FIGS. 1-3, or the like), and user 645 (similar to users 115, 210, 310a, and 310b of FIGS. 1-3, or the like), each of which might be located in first space 650 (similar to first space 135, classroom 205, and auditorium 305 of FIGS. 1-3, or the like). System 600 might further comprise remote computing system 655 (similar to remote computing system 105b of FIG. 1, or the like) and corresponding database(s) 660 (similar to database(s) 110b of FIG. 1, or the like). In some embodiments, system 600 might further comprise one or more cameras 665 (optional; similar to camera(s) 150, 235, and 335 of FIGS. 1-3, or the like).

In operation, the computing system 625, the remote computing system 655, or the user device 605a or 605b (collectively, "computing system" or the like) might receive, from at least one audio sensor 635 among the one or more audio sensors 635a-635n disposed within the first space 650, voice signals corresponding to voices associated with individuals 640 present within the first space 650. The computing system might analyze the received voice signals to identify one or more individuals 640 who are present within the first space 650. The computing system might present, within a user interface of the user device 605a or 605b associated with the user 645, information regarding the identified one or more individuals 640 to assist the user 645 in coordinating discussions among the individuals 640 present within the first space 650.

According to some embodiments, the user 645 might be a teacher and the individuals 640a-640n present within the first space 650 might be students. In such cases, the computing system might track which students spoke what words and when and in response to which questions posed by the teacher. Alternatively, or additionally, the computing system might generate a list of students in a participation list based at least in part on one or more of responses by the students, lack of participation by particular students, or preferences established by the teacher, and/or the like.

Alternatively, the user 645 might be one of a public speaker, a presenter, a celebrity, or a politician, and/or the like, while the individuals 640 present within the first space 650 might be one of audience members, fans, press members, or citizens, and/or the like. In such cases, the computing system might track which individual has questions for the user; and might generate a list of questions by identified individuals based at least in part on one or more of order of questions raised by the individuals, number of questions raised by particular individuals, or preferences established by the user, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, with a computing system and from at least one audio sensor among one or more audio sensors disposed within a first space, voice signals corresponding to voices associated with individuals present within the first space;
    analyzing, with the computing system, the received voice signals to identify one or more individuals who are present within the first space;
    presenting, with the computing system and within a user interface of a user device associated with a user, information regarding the identified one or more individuals to assist the user in coordinating discussions among the individuals present within the first space, wherein the user is a teacher and the individuals present within the first space are students; and tracking, with the computing system, which students spoke what words and when and in response to which questions posed by the teacher.

2. The method of claim 1, wherein the computing system comprises at least one of a classroom computing system, a lecture room computing system, a conference hall computing system, an auditorium computing system, a sports arena computing system, a press conference computing system, a conference room computing system, a moderator computing system, a processor of a display device running a software application ("app"), a processor of the user device running an app, a server computer over a network, or a cloud-based computing system over a network.

3. The method of claim 1, wherein the user device comprises at least one of a tablet computer, a desktop computer, a laptop computer, a presenter computer, a conference room computer, an auditorium computer, a smart phone, a mobile phone, or a wearable device.

4. The method of claim 1, wherein the one or more audio sensors comprise a plurality of microphones distributed throughout the first space to optimize audio pickup within the first space.

5. The method of claim 1, further comprising:
generating, with the computing system, a list of students in a participation list based at least in part on one or more of responses by the students, lack of participation by particular students, or preferences established by the teacher.

6. The method of claim 1, wherein the user is one of a public speaker, a presenter, a celebrity, or a politician, and wherein the individuals present within the first space are one of audience members, fans, press members, or citizens.

7. The method of claim 6, further comprising:
tracking, with the computing system, which individual has questions for the user; and
generating, with the computing system, a list of questions by identified individuals based at least in part on one or more of order of questions raised by the individuals, number of questions raised by particular individuals, or preferences established by the user.

8. The method of claim 1, wherein the user is a moderator or a group leader, and wherein the individuals present within the first space are one of group participants, conference call participants, or collaborators.

9. The method of claim 1, wherein the first space comprises one of a classroom, a lecture hall, a convention hall, an auditorium, a sports arena, a press conference space, or a conference room.

10. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive, from at least one audio sensor among one or more audio sensors disposed within a first space, voice signals corresponding to voices associated with individuals present within the first space;
analyze the received voice signals to identify one or more individuals who are present within the first space;
present, within a user interface of a user device associated with a user, information regarding the identified one or more individuals to assist the user in coordinating discussions among the individuals present within the first space, wherein the user is a teacher and the individuals present within the first space are students; and
tracking, with the apparatus, which students spoke what words and when and in response to which questions posed by the teacher.

11. The apparatus of claim 10, wherein the apparatus comprises at least one of a classroom computing system, a lecture room computing system, a conference hall computing system, an auditorium computing system, a sports arena computing system, a press conference computing system, a conference room computing system, a moderator computing system, a processor of a display device running a software application ("app"), a processor of the user device running an app, a server computer over a network, or a cloud-based computing system over a network.

12. The apparatus of claim 10, wherein the user device comprises at least one of a tablet computer, a desktop computer, a laptop computer, a presenter computer, a conference room computer, an auditorium computer, a smart phone, a mobile phone, or a wearable device.

13. The apparatus of claim 10, wherein the one or more audio sensors comprise a plurality of microphones distributed throughout the first space to optimize audio pickup within the first space.

14. The apparatus of claim 10, wherein the user is one of a public speaker, a presenter, a celebrity, or a politician, and wherein the individuals present within the first space are one of audience members, fans, press members, or citizens.

15. The apparatus of claim 10, wherein the user is a moderator or a group leader, and wherein the individuals present within the first space are one of group participants, conference call participants, or collaborators.

16. The apparatus of claim 10, wherein the first space comprises one of a classroom, a lecture hall, a convention hall, an auditorium, a sports arena, a press conference space, or a conference room.

17. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive, from at least one audio sensor among one or more audio sensors disposed within a first space, voice signals corresponding to voices associated with individuals present within the first space;
analyze the received voice signals to identify one or more individuals who are present within the first space;
present, within a user interface of a user device associated with a user, information regarding the identified one or more individuals to assist the user in coordinating discussions among the individuals present within the first space, wherein the user is a teacher and the individuals present within the first space are students; and
tracking, with the computing system, which students spoke what words and when and in response to which questions posed by the teacher.

* * * * *